(12) United States Patent
Tages

(10) Patent No.: US 12,092,237 B1
(45) Date of Patent: *Sep. 17, 2024

(54) CHUCK FOR AIRPUMP

(71) Applicant: Radian Technologies Corporation, Coral Springs, FL (US)

(72) Inventor: Fernando Tages, Coral Springs, FL (US)

(73) Assignee: Radian Technologies Corporation, Coral Springs, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/678,952

(22) Filed: May 30, 2024

Related U.S. Application Data

(60) Division of application No. 18/394,054, filed on Dec. 22, 2023, now Pat. No. 12,013,054, which is a continuation-in-part of application No. 18/317,374, filed on May 15, 2023, now Pat. No. 11,850,898.

(51) Int. Cl.
*F16K 31/60* (2006.01)
*F16K 24/06* (2006.01)

(52) U.S. Cl.
CPC ............ *F16K 31/602* (2013.01); *F16K 24/06* (2013.01); *Y10T 137/3724* (2015.04)

(58) Field of Classification Search
CPC ........ B60C 29/064; B60S 5/04; F04B 33/005; F16K 24/06; F16K 31/602; Y10T 137/3584; Y10T 137/3724
USPC ................... 141/38; 251/149.1, 149.6, 149.8
See application file for complete search history.

(56) References Cited

U.S. PATENT DOCUMENTS

| | | | |
|---|---|---|---|
| 5,538,398 | A | 7/1996 | Elson |
| 5,715,554 | A | 2/1998 | Downs et al. |
| 6,027,319 | A | 2/2000 | Windfordner et al. |
| 6,076,544 | A | 6/2000 | Pierce |
| 6,102,063 | A | 8/2000 | Pierce et al. |
| 6,146,116 | A | 11/2000 | Wu et al. |
| 7,032,613 | B2 | 4/2006 | Delorme |
| 7,273,066 | B2 | 9/2007 | van der Blom |
| 7,516,910 | B1 | 4/2009 | DeWall et al. |
| 7,607,382 | B2 | 10/2009 | Wu |
| 8,402,989 | B2 | 3/2013 | Chuang |
| D744,002 | S | 11/2015 | Scott et al. |
| 9,227,600 | B2 | 1/2016 | Chen |
| 9,309,980 | B2 | 4/2016 | Ward et al. |
| 9,328,834 | B2 | 5/2016 | Wang |
| 9,387,738 | B2 | 7/2016 | Wang |
| 9,587,753 | B2 | 3/2017 | Wang |
| 9,765,766 | B2 | 9/2017 | Lageson et al. |
| 9,855,928 | B2 | 1/2018 | Currie et al. |
| 10,125,753 | B2 | 11/2018 | Poertner |
| 10,247,319 | B1 | 4/2019 | Wang |
| 10,359,033 | B2 | 7/2019 | Hermansen et al. |

(Continued)

*Primary Examiner* — Robert K Arundale
(74) *Attorney, Agent, or Firm* — Leech Tishman Fuscaldo & Lampl, LLC

(57) ABSTRACT

A chuck for inflating a tire having a valve includes a valve engagement device having a longitudinal axis, a first portion and a second portion that move laterally with respect to the longitudinal axis and in parallel with each other to define a chamber for receiving the valve stem. An actuator that moves longitudinally with respect to the valve engagement device causes the first portion and the second portion to move laterally and in parallel. The first portion and the second portion of the valve engagement device include protrusions, and the actuator contacts the protrusions as the actuator is moved longitudinally.

20 Claims, 17 Drawing Sheets

(56) References Cited

U.S. PATENT DOCUMENTS

| | | |
|---|---|---|
| 10,422,328 B2 | 9/2019 | Hermansen et al. |
| 10,760,708 B1 | 9/2020 | Ashmead et al. |
| D903,719 S | 12/2020 | DeBaker et al. |
| 11,235,738 B2 | 2/2022 | Park et al. |
| 2008/0236675 A1 | 10/2008 | Wang et al. |
| 2012/0125446 A1 | 5/2012 | Chuang |
| 2017/0276277 A1 | 9/2017 | Wang |

Handle closing/closed - engaged

Handle open - disengaged

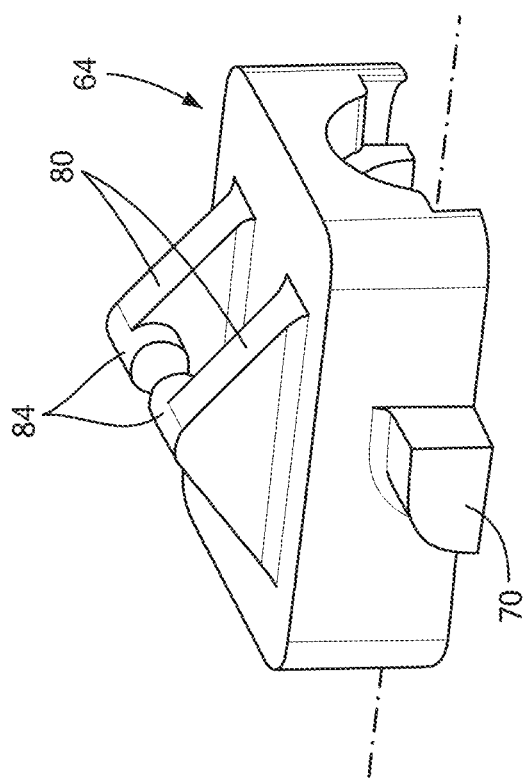
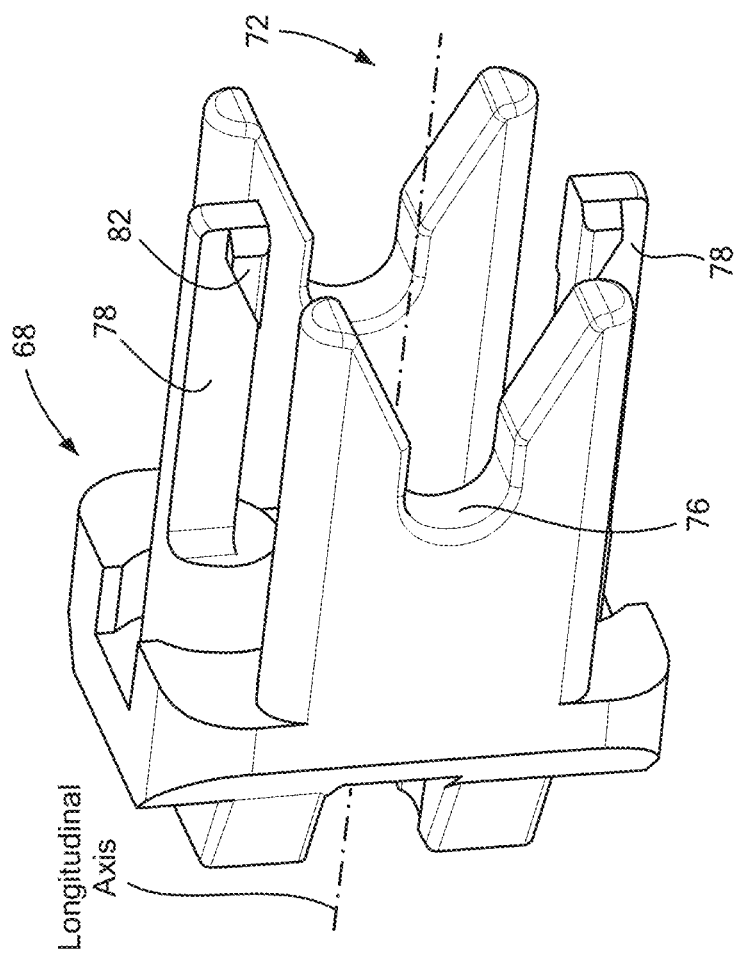
FIG. 19
FIG. 20

CHUCK FOR AIRPUMP

CROSS-REFERENCE TO RELATED APPLICATION

This application is a continuation-in-part of U.S. application Ser. No. 18/394,054, filed Dec. 22, 2023 and is a continuation-in-part of U.S. application Ser. No. 18/317,374, filed May 15, 2023, now U.S. Pat. No. 11,850,898 issued Dec. 26, 2023.

FIELD

The present technology is generally related to pumps for pneumatic tires, and more particularly to a pump chuck for use with tire inflation valves including Presta valves.

BACKGROUND

A pump chuck is a device that is attached to the end of a hose leading from a pump or compressed air source to connect the pump and hose to an inflation valve for an inflatable object such as a pneumatic tire. The technology used in current pump chucks is very old, and depending upon the type of valve that the pump chuck engages, such as a bicycle tire with a Presta type valve, the task of attachment can be difficult and frustrating.

All pump chucks on the market today have the same basic configuration which hasn't changed in about 100 years when the Presta valve was invented, and bicycle manufacturers began to replace solid rubber tires with removable pneumatic tires filled with air. An early valve, known as the Dunlop valve, was the first popular valve used for the new pneumatic bike tires. Over time, as wheels and tires became lighter, narrower, and inflated to higher pressures, the smaller Presta valve, compatible with higher pressures, became popular. Today, approximately 80 million bikes are sold each year (20 million in the USA) and most have tires with a Presta type valve.

To effectively inflate a tire, a pump chuck must create an air seal with a tire valve. Known chucks intended for use with Presta valves create an air seal using a rubber disc (sometimes called a gasket) which has a hole to receive the tip of a Presta valve. The hole has a diameter that is smaller than the of the tip of the Presta valve and as the pump chuck is joined with the Presta valve, the rubber disc is deformed/stretched over the larger diameter threaded tip region of the Presta valve to create an air-tight seal. Today's road bike tires operate at 100-120 psi of pressure.

However, existing chucks have disadvantages to their configuration that make them difficult and frustrating to use. For example, known pump chucks require a user to apply a moderate to high force along the longitudinal axis of the Presta valve to push the rubber disc seal into the sealing position. This is generally a two-handed operation as the user must forcefully hold the pump chuck is sealing engagement with one hand while rotating a locking lever through 90 degrees of rotation. This introduces a resultant torque to the pump chuck which is difficult to counter and can result in bending or damage to the valve. Also, known pump chucks often leak while inflating the tire because the user has not attached it correctly due to the difficulty of installing the pump chuck on the Presta valve. Even if engaged correctly, the tire often loses 10-15 psi of pressure or more during removal of the pump chuck. Further, the friction of engaging the Presta valve with the disc and the repeated stretching degrades the disc over time resulting in a poor seal and leaks which worsen over time with continued use. The disc is not readily visible in known pump chucks and is not user replaceable. Generally, when the pump chuck seal starts to leak, a user replaces an entire pump.

SUMMARY

The present invention overcomes the disadvantages of known pump chucks. It is easily used with a single hand, requires little force to engage with a valve, and is resistant to degradation of the seal.

In one aspect, a chuck for inflating a tire having a Presta valve includes a valve engagement device defining an aperture with a central axis and a diameter, the valve engagement device movable radially with respect to the central axis to increase and decrease the diameter of the aperture.

A locking device can engage with the valve engagement device to lock the valve engagement device in a selected radial position with respect to the central axis of the aperture.

A seal can be positioned within the valve engagement device, the entire seal moving radially with the valve engagement device, wherein the seal has a first end with a first diameter and a second end having a second diameter, wherein the first and second diameters are the same as the seal moves radially, and wherein the seal includes two opposing, contoured portions each having a longitudinal axis, and wherein the longitudinal axis of each contoured portion is parallel to the central axis of the valve engagement device as the seal moves radially.

A locking device suitable for the chuck or for other tools, can include a serpentine track, a pin disposed within the track, and a lever connected to the pin, wherein movement of the lever moves the pin within the track from a first position to a second position. A biasing element can provide a lateral biasing force to the pin within the track.

In another aspect of the invention, a chuck for inflating a tire with a valve stem includes a valve engagement device has a longitudinal axis, a first portion and a second portion that move laterally with respect to the longitudinal axis and in parallel with each other to define a chamber for receiving the valve stem. An actuator moves longitudinally with respect to the valve engagement device to cause the first portion and the second portion to move laterally and in parallel.

A lift device moves longitudinally with respect to the valve engagement device to cause the first portion and the second portion to move laterally and in parallel away from each other.

Longitudinal movement of the actuator element toward the valve engagement device causes the valve engagement device to close and longitudinal movement of the actuator element away from the valve engagement device causes the valve engagement device to open.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 19 is a perspective view of the actuator of FIGS. 15-18; and FIG. 20 is a perspective view of a first valve engagement portion, with the second portion being a mirror image thereof.

DETAILED DESCRIPTION

Figure 1:
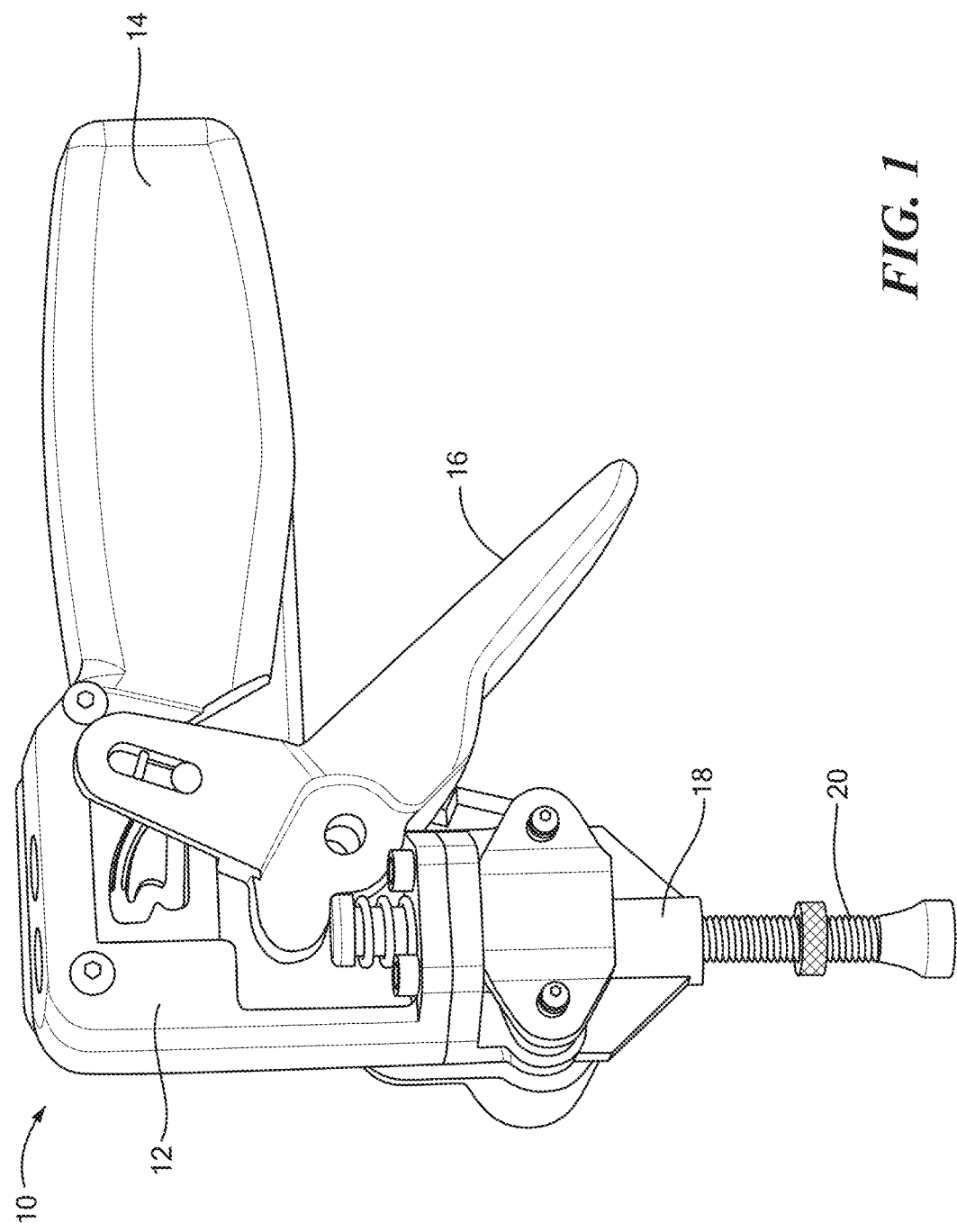
FIG. 1 is a perspective view of a pump chuck in accordance with the invention.

The present invention overcomes deficiencies in known Presta valve inflation chucks and locking mechanisms for inflation chucks, as well as locking mechanisms generally. Referring to FIG. 1, an exemplary pump chuck 10 for inflating a tire having a Presta valve is shown. The pump chuck 10 includes a chuck body 12 having a pistol style grip 14, a locking lever 16, and a valve guide 18 shown in engagement with a Presta valve 20. The valve guide 18 is located at one end of the chuck body 12 to receive a distal portion of the Presta valve having an air inlet. The valve guide stabilizes the chuck body 12 so that it remains stationary and does not wobble while positioning sealing elements (described below) around the Presta valve and prevents bending of the tip of the Presta valve when attaching or removing the pump chuck. As shown, the valve guide allows approximately 8-10 mm of the distal end of the Presta valve to be introduced within the pump chuck.

Figure 2:
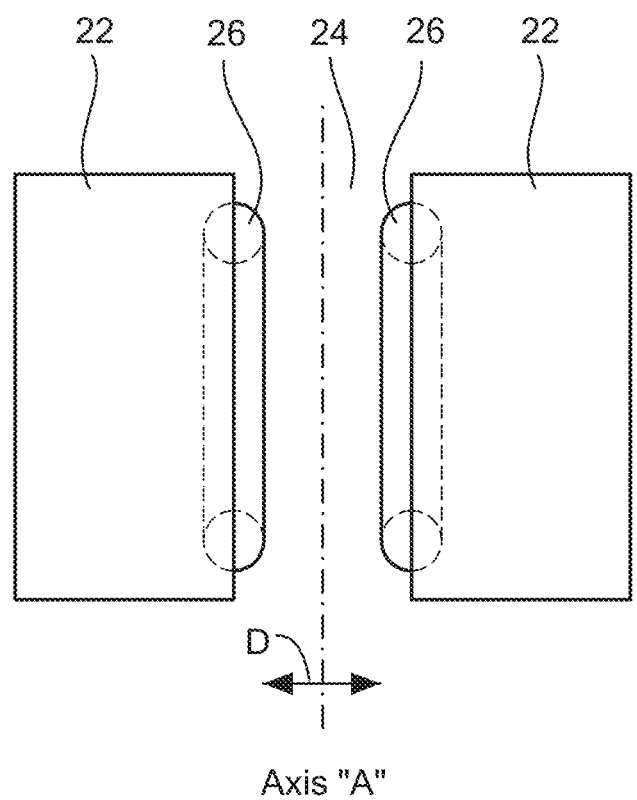
FIG. 2 is a schematic side view of valve guide showing an axial aperture.

A notable feature of the invention is the structure and operation of sealing elements with respect to a Presta valve. FIG. 2 highlights these features which are shown in more detail in subsequent figures. Referring to FIG. 2 a valve engagement device 22 disposed within the valve guide 18 and chuck body 12 defines an aperture 24 with a central axis "A" and a diameter "D." As shown, the valve engagement device 22 includes two portions movable radially with respect to the central axis "A" to increase and decrease the diameter of the aperture 24 to define open and closed positions. The valve engagement device 22 or carrier includes an inner face that defines or carries a resilient sealing element 26. In the open position, the diameter "D" is wide enough to readily receive a Presta valve with no contact friction between the Presta valve and the resilient sealing element 26. Thus, the lack of friction reduces or eliminates wear, deterioration, or damage to the sealing element as well as eliminating any force required to receive the Presta valve. In the closed position, the diameter "D" has been reduced sufficiently to cause the resilient sealing element 26 to gently compress around a distal portion of the Presta valve 20 to create an air-tight seal.

As shown, the valve engagement device 22 and sealing element 26 are configured as two components that move radially with respect to the central axis "A" to increase or decrease the diameter "D" of the central axis "A." The diameter "D" is uniform along the length of the valve engagement device 22. In other words, the diameter of the aperture 24 at each end of the engagement device 22 is equivalent in open and closed positions as well as during movement between the positions. The valve engagement device elements do not move at an angle with respect to the central axis to cause the diameter to be greater at one end of the valve engagement device than at the other. If the engagement device includes two or more opposing portions, then the portions can move in unison or sequentially. As shown, the sealing element 26 includes two opposing, contoured sealing element portions each having a longitudinal axis, and wherein the longitudinal axis of each contoured sealing element portion is parallel to the central axis of the valve engagement device, aperture and valve guide as the engagement device and sealing element portions move radially.

In another configuration, the diameter "D" of the aperture 24 at each end of the engagement device 22 can be different. In other words, the aperture 24 at one end can be larger than the diameter at the other end. The valve engagement device can be wider at one end than at the other, or the valve engagement device can have the same diameter at each end, but the sealing element 26 can be sized or positioned to create a different diameter at each end. Additional details of this are shown in FIGS. 3, 7, 8, 9 and 10. Refer to FIG. 9 wherein diameters D1 and D2 are labeled and wherein D2 is greater than D1. The portion of the Presta valve 20 at the location of D1 is narrower than the air passage 34 at the location of D2. Accordingly, the aperture formed by each end of the opposing seals readily matches and conforms to the different diameters of the Presta valve and internal structure of the valve guide 18. Although this is shown in the sectional view of other figures, the seals 26 and their function are perhaps more readily perceived in perspective.

Further, in FIG. 9, the contoured shape of the upper or first seal 26 and lower or second seal 26 is more readily visible as is the way each seal 26 is seated in a recess in a lip portion 27 of each portion of the valve engagement device 22.

Figure 10:
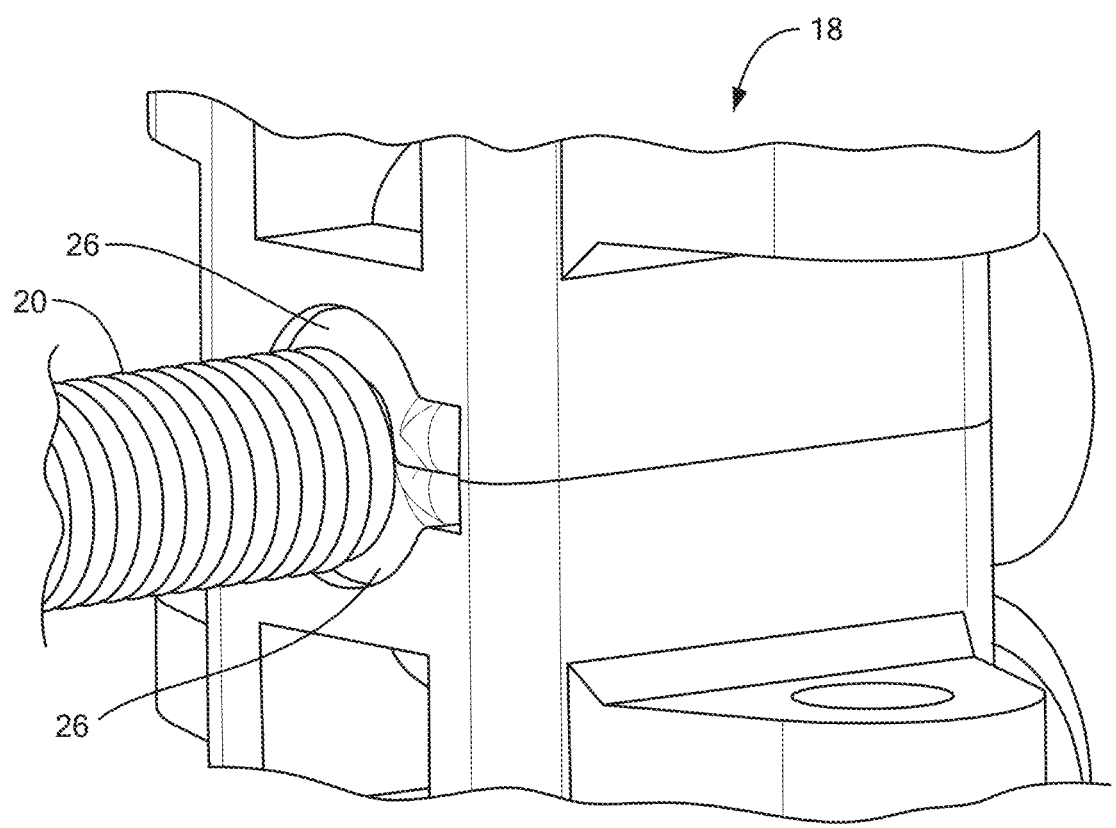
FIG. 10 is a perspective view of the pump chuck for FIG. 9 in a closed state.

FIG. 10 is a perspective view of the valve guide 18 showing the seal 26 in a second or closed position around a portion of the Presta valve 20 to form an airtight seal, wherein the other end of the seal forms an airtight seal around an end portion of the chuck body 12.

In another configuration, the sealing element 26 is a single piece such as a resilient ring or tube that is stretched radially to provide the open position or allowed to constrict radially to provide the closed position.

Figure 3:
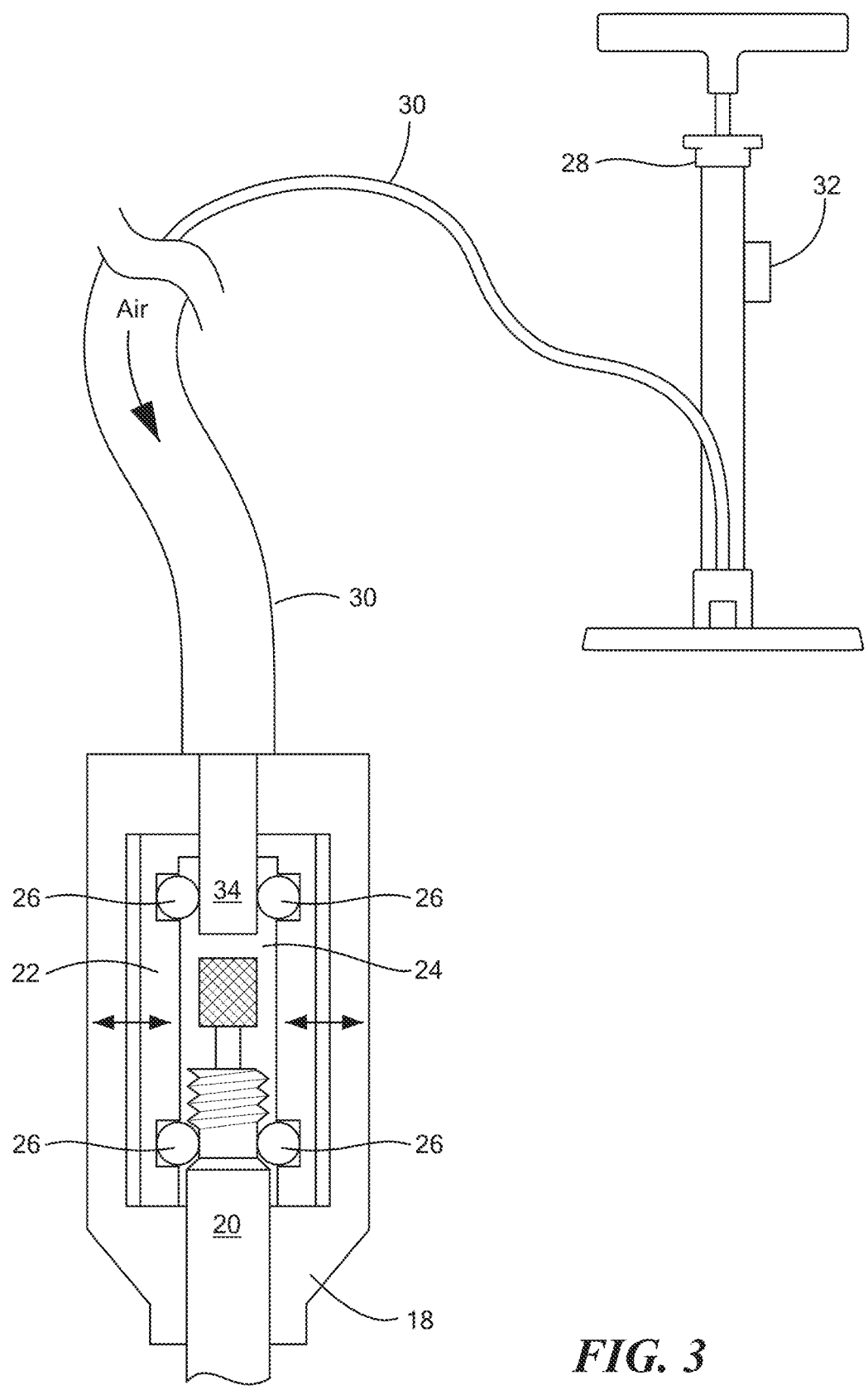
FIG. 3 is a sectional schematic view of the air flow path from the pump through a Presta valve.

Referring now to FIG. 3 a simplified cutaway view of the valve guide 18 is shown. A Presta valve 20 is shown inserted into the aperture 24 of the valve guide 18 and the valve engagement device 22 with sealing element 26 are shown in the closed position so that the sealing element 26 presses against the Presta valve 20 to create an airtight seal. The aperture 24 now forms an air chamber through which air from a pump 28 can flow through an outlet in the pump to a conduit (tube) 30, into and through the grip 14 and chuck body 12, into the Presta valve 20, and then to a tire (not shown). A storage element 32 is shown associated with the pump 28 for retention of the pump chuck 10.

Figure 4:
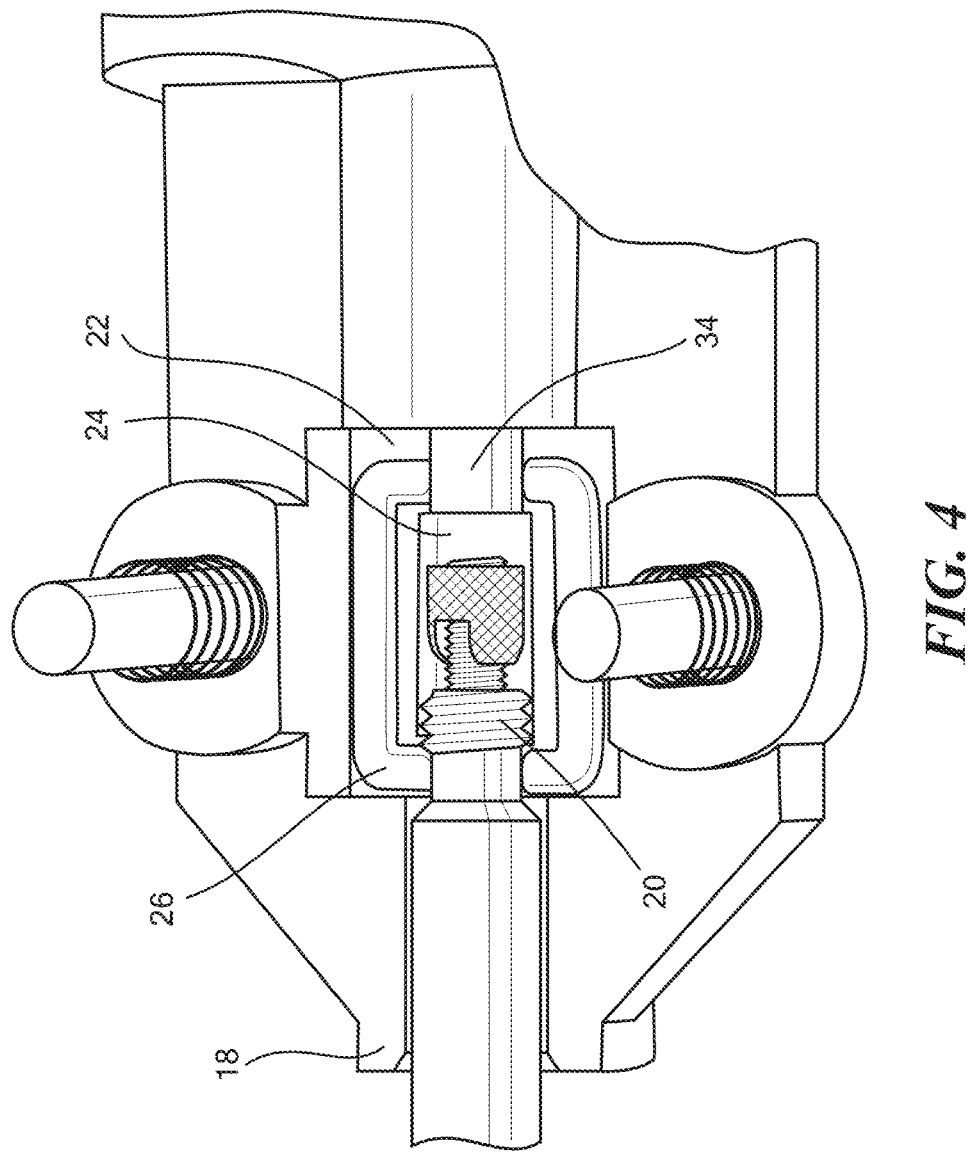
FIG. 4 is section view of the valve guide 18 shown in FIG. 3.
Figure 5:
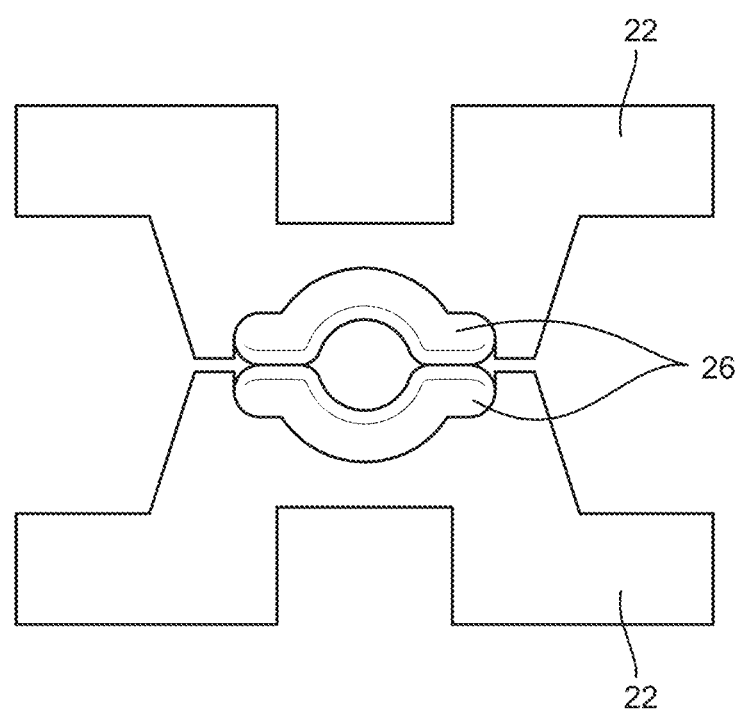
FIG. 5 is an axial view of a complete sealing element of which one portion is shown in FIG. 4.

FIG. 4 illustrates one portion of the 2-part engagement device 22, containing one portion of a 2-part sealing element 26, with a Presta valve 20 disposed through the valve guide 18 into aperture 24 which provides the air chamber leading to an air passage 34. FIG. 5 is a top or axial view that illustrates both portions of the 2-part sealing element 26 in the closed or sealed state.

Figure 6:
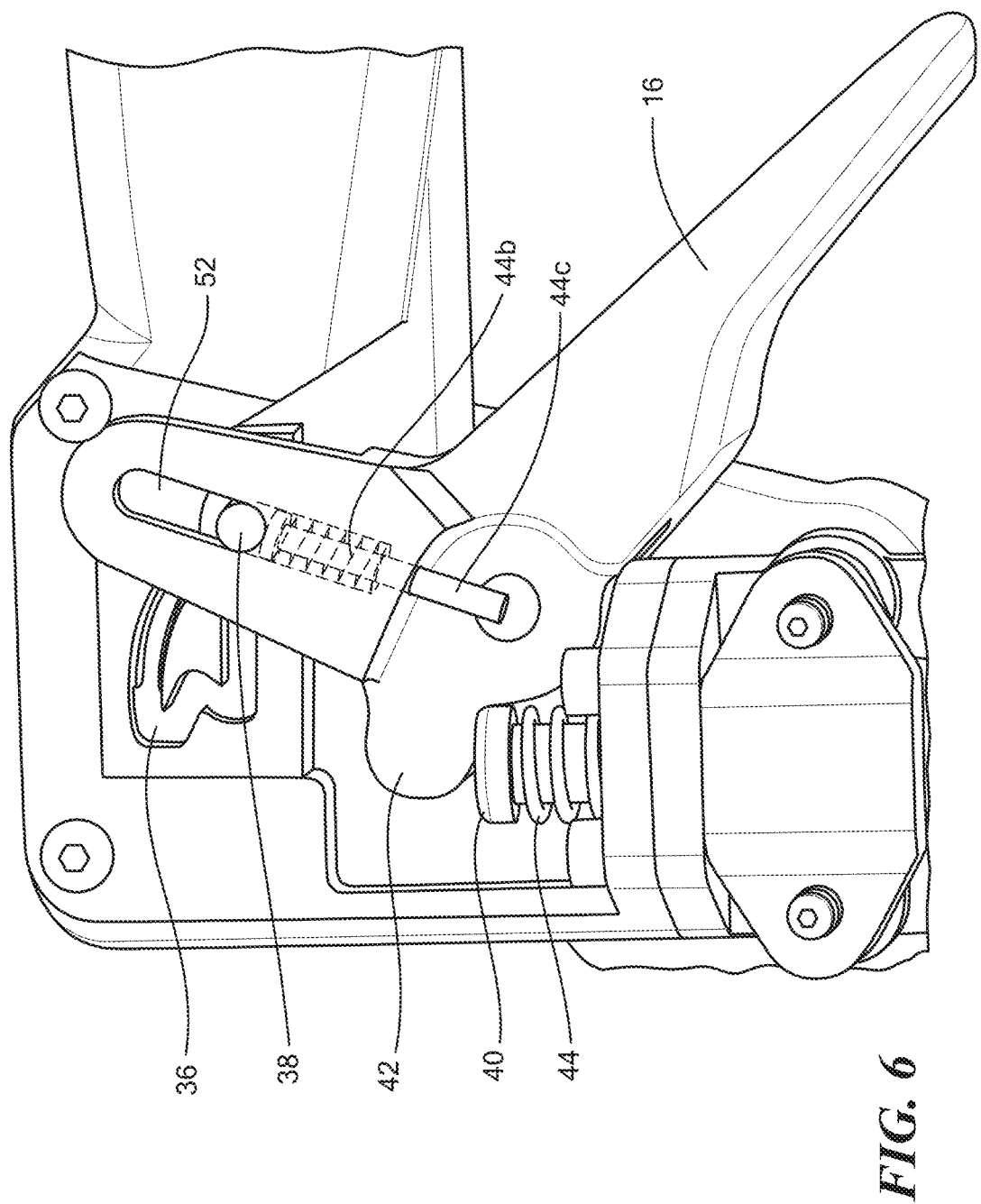
FIG. 6 is a partial cut-away view of the chuck body shown in FIG. 1 to illustrate a locking mechanism.

Referring now to FIG. 6, a locking device is associated with and actuated by the locking lever 16 to position the valve engagement device 22 in the open and closed positions and to lock the valve engagement device in a selected radial position with respect to the central axis of the aperture. The two portions of the valve engagement device 22 are displaced (moved) in unison when the locking lever 16 is actuated. The locking device includes a serpentine track 36 housed in the chuck body 12. A follower or pin 38 is disposed within the track 36 and is connected to the locking lever, wherein movement of the lever moves the pin within the track from a first position to a second position. A cam rod 40 is slidably disposed within the chuck body 12. One end of the cam rod makes contact with a protuberance 42 on the locking lever 16. When the locker lever is pulled, the protuberance pushes on the end of the cam rod to cause it to move toward the valve guide 18 where it pushes the valve engagement device 22 to cause it to move to the closed position. A biasing element 44, such as a spring, urges the cam rod away from the valve guide to allow the valve engagement device to move to the open position. A second biasing element 44b, such as a spring disposed around a second pin 44c provides a lateral biasing force to the pin 38 within the track so that as the locking lever moves, the pin follows the serpentine path. A notch is provided in the track so that the locking lever is held in place (locked) when pulled far enough for the pin 38 to be in the notch. Further pulling and releasing the locking lever allows the biased pin 38 to move out of the notch and unlock the locking lever.

Figure 7:
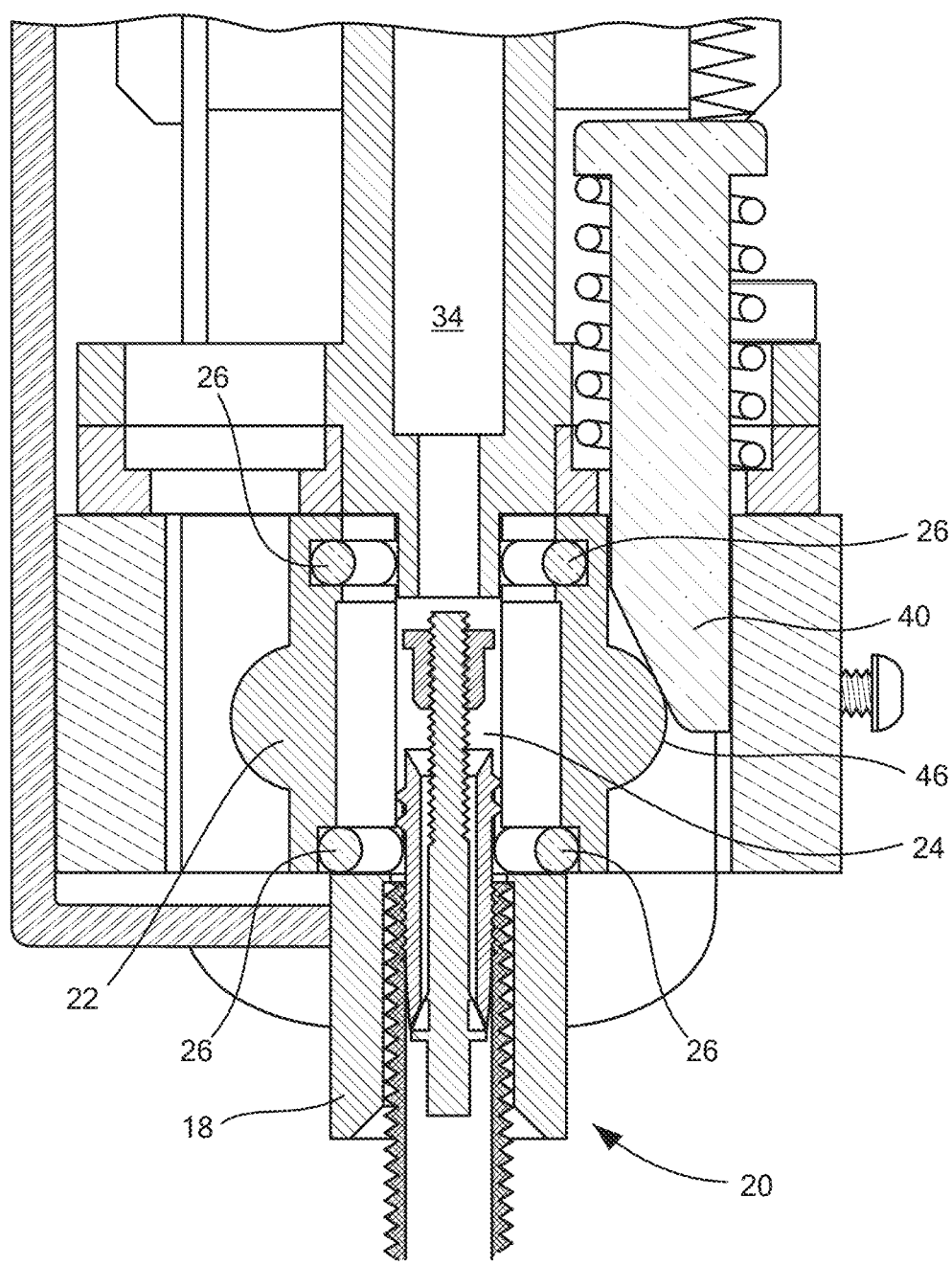
FIG. 7 is a sectional view of the pump chuck of FIG. 1 showing the seal in an open state.
Figure 8:
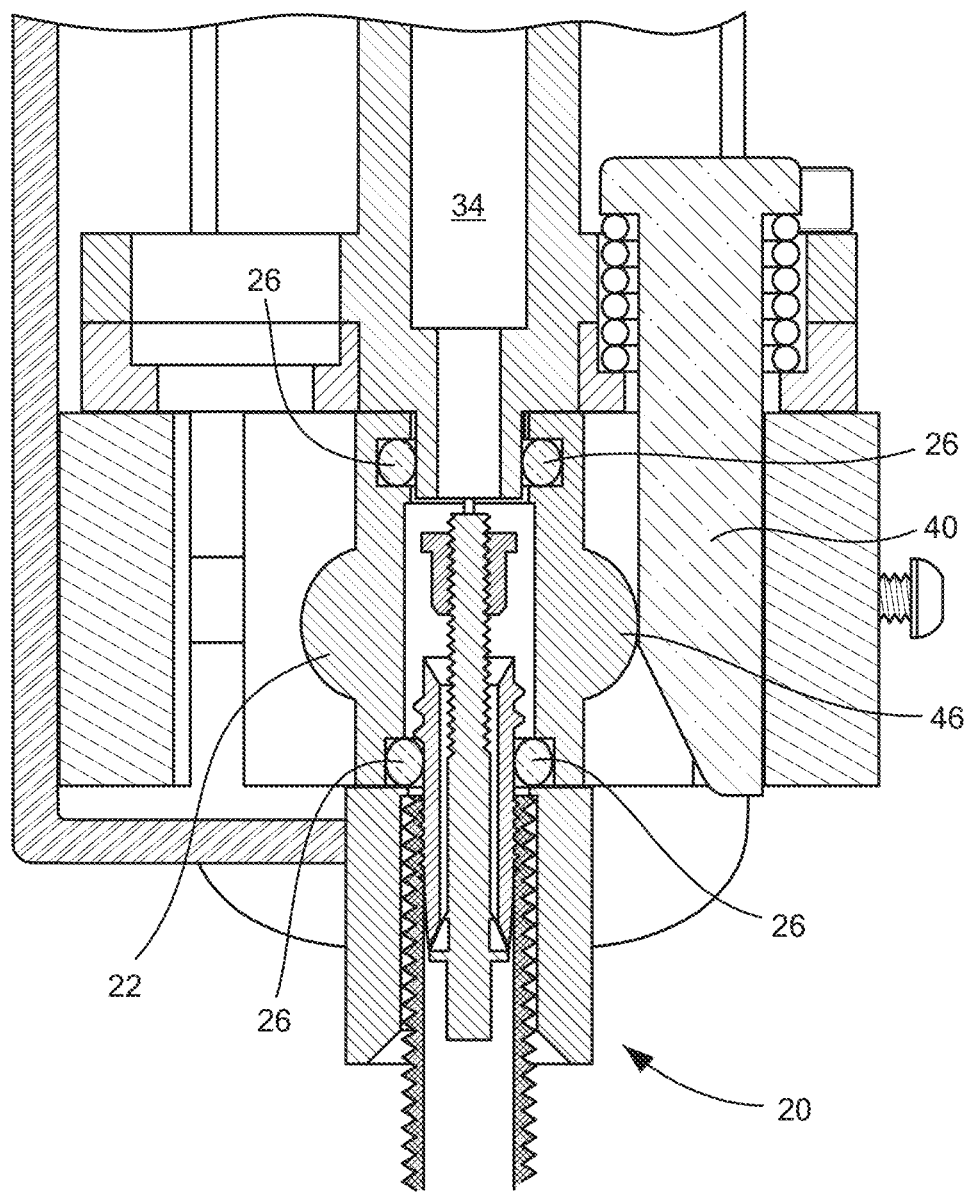
FIG. 8 is a sectional view of the pump chuck of FIG. 1 showing the seal in a closed state.
Figure 9:
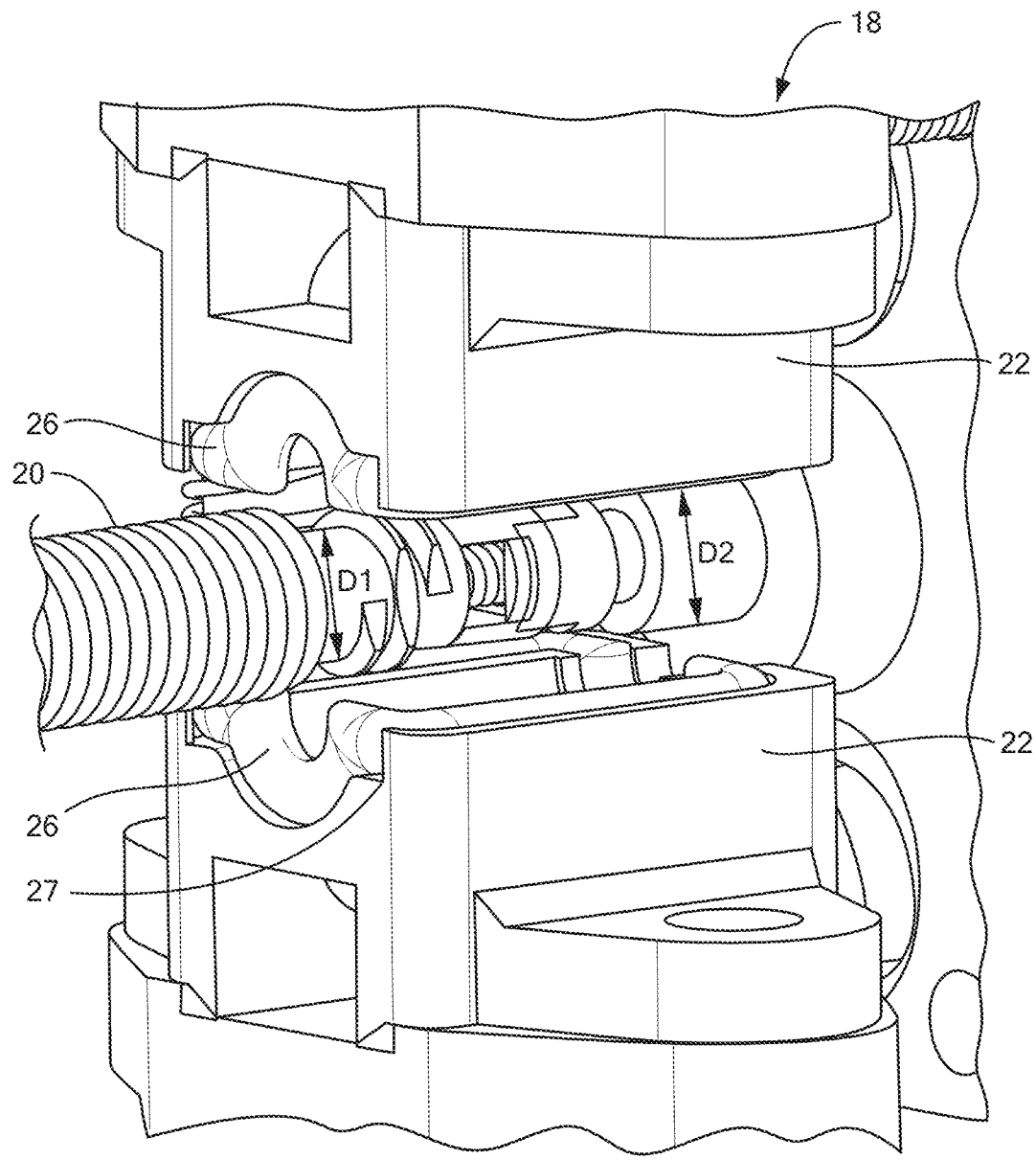
FIG. 9 is a perspective view of the pump chuck of FIG. 1 in an open state.

FIGS. 7 and 8 show the sealing mechanism in an open and closed state, respectively. In these views the cam rod 40 is shown retracted in FIG. 7 and extended in FIG. 8. An annular protuberance 46 is provided as part of the engagement device 22 to provide a contact face for the angled end of the cam rod 40. Thus, as the cam rod 40 is pushed "downward" as shown in the FIG. 8, the engagement device 22 is urged to move radially to press the sealing element 26 tightly against the Presta valve 20. When the cam rod 40 is moved "upward" as shown in FIG. 7, the engagement device 22 moves radially away from the Presta valve 20 and the resilient scaling element 26 moves radially away from the Presta valve and disengages from it.

A pressure gauge button (not shown) can be pushed momentarily to allow the air pressure in the tire to be read by a pump gauge (not shown) without pumping the pump. This button can be actuated while maintaining a one-handed grip on the pump chuck.

An air bleed button (not shown) can also be provided, wherein a momentary push button allows excess air to be released from a tire when the tire pressure is above an identified pressure threshold. This button can be actuated while maintaining a one-handed grip on the pump chuck.

As can be appreciated by the above description, the present invention makes normally difficult attachment and removal of a pump chuck easy without loss of air. Zero force is required to seat the pump chuck onto a Presta valve. There is no need to use two hands to attach the pump chuck to a Presta valve because the pistol type grip with an auto-locking lever allows single hand operation.

In addition to the above noted utility in the context of inflation of a bicycle tire, a one-handed locking mechanism has very broad utility in many applications. For example, levers are used in many devices including common tools such as pliers, clamps, cutting tools, cable pullers, pressure washer guns, garden hose nozzles, and the like. Many tools have structures for locking the lever in a desired position, but known mechanisms require one or more operations by a second hand to unlock the lever, such as by pressing a release lever and/or releasing a hand from a hand grip to unlock the lever. By contrast, the locking device of the present invention has broad applicability and advantages for lever equipped handheld devices, wherein a one-handed locking lever locks and unlocks simply by squeezing the lever with one hand. A second hand is not needed, and the first hand does not need to be repositioned.

Figure 11:
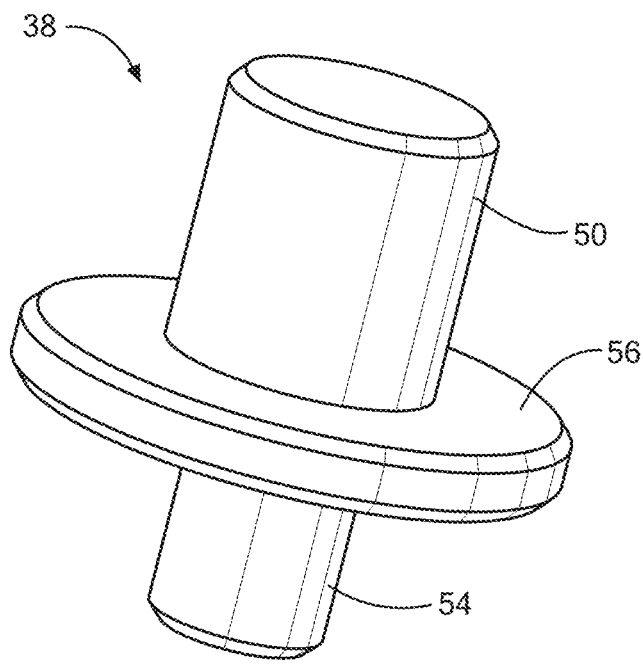
FIG. 11 illustrates details of the pin of FIG. 6.

To better understand the locking mechanism, reference is now made to FIGS. 11-14 which depict the serpentine track 36 shown in FIG. 6 in combination with references to FIG. 6. FIG. 11 shows the pin 38 in a perspective view having a lever slot end 50 that is slidably disposed within a lever slot 52 that is part of the lever 16. A track slot end 54 is positioned within the serpentine track 36. A cuff 56 is broader than the lever slot 52 to prevent lateral movement of the pin 38, thus holding the track slot end 54 within the serpentine track 36.

Figure 12:
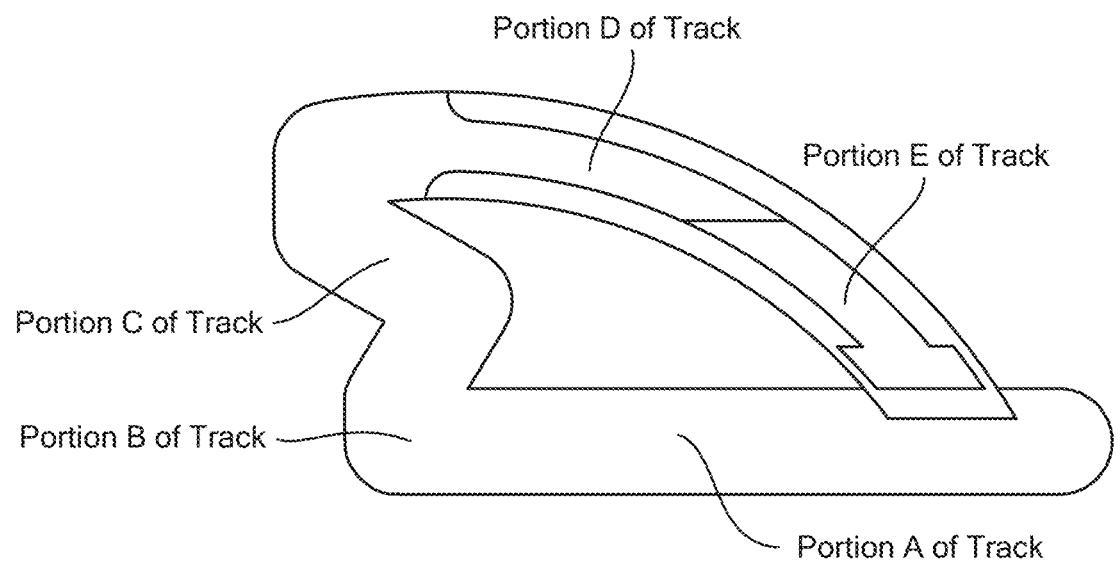
FIGS. 12-14 shows details of the serpentine track of FIG. 6.
Figure 13:
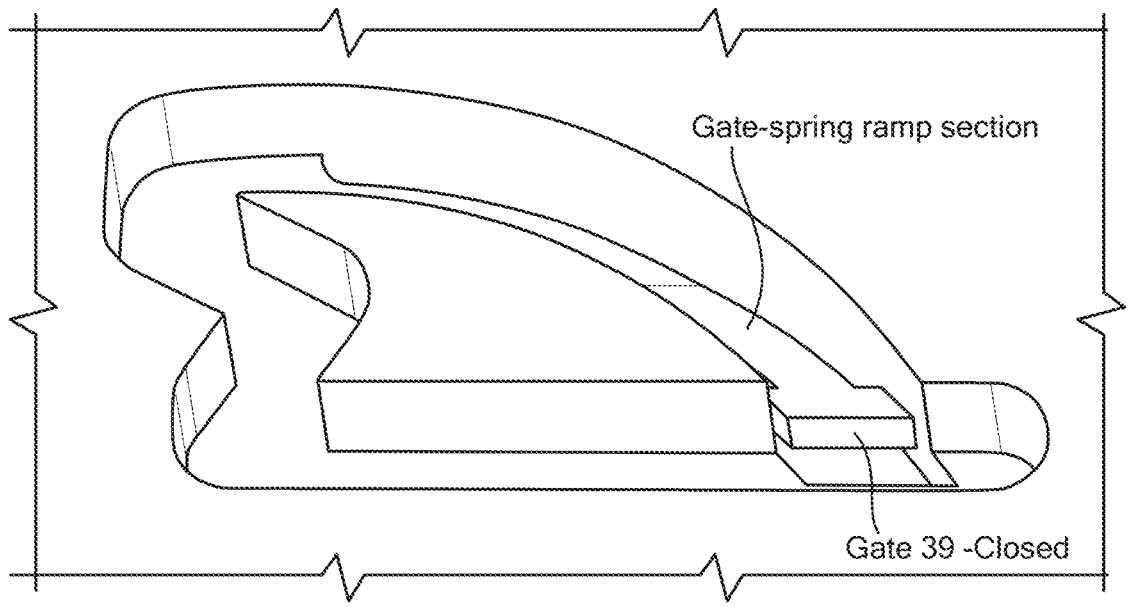
Figure 14:
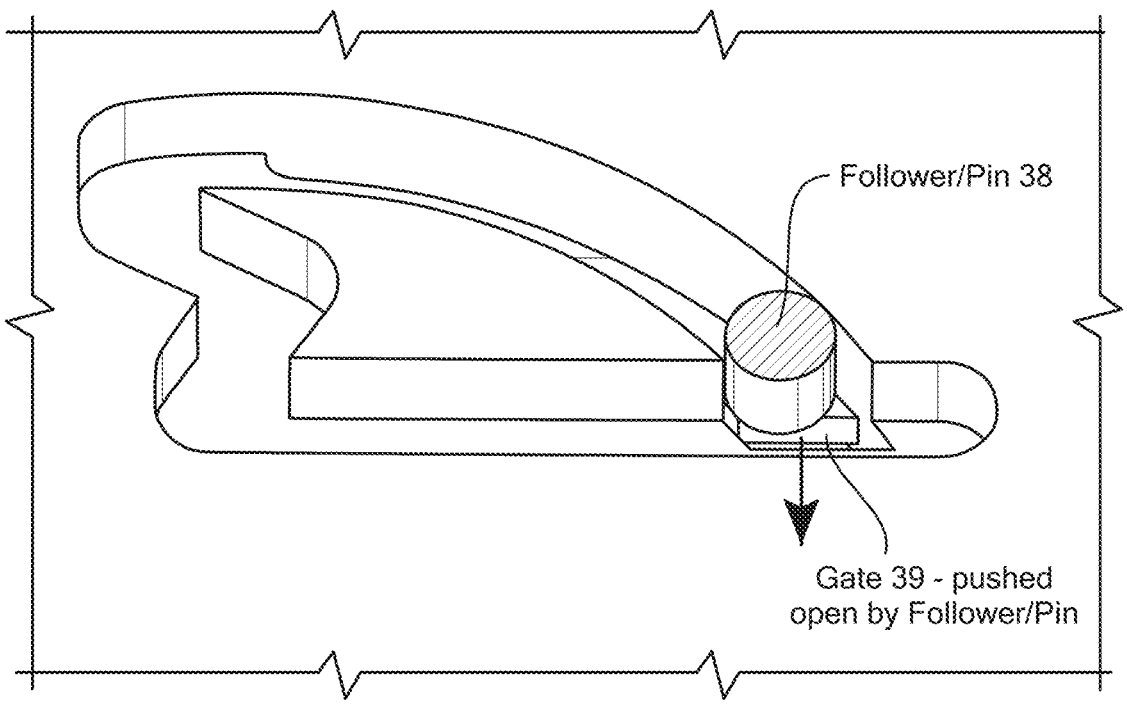

As shown in FIG. 6, the lever 16 is in and open and unlocked position. In FIG. 12 the serpentine track 36 is shown with portions of the track labeled A, B, C, D and E. Portion E can move laterally with respect to portion B to create a gate 39 that allows or impedes movement of the pin 38 within the serpentine track (track). The gate provides a spring ramp as shown in FIGS. 13 and 14.

When the lever 16 is squeezed, the pin 38 moves past the gate. The gate is closed and prevents the pin from entering portion E of the track. The pin 38 continues along the track portion A and then moves out of track portion A and into track portion B which curves back toward portion E. The pin 38 is trapped from further moving into track portion C by the wall of track portion B. When the lever is released, the pin 38 moves to the intersection of track portion B and track portion C. The pin is trapped from moving anywhere. It is now in the locked/closed position.

To unlock, the lever 16 is fully squeezed once again (small movement of the lever). The pin moves out of track portion C which curves away from portion E and into track portion D. The lever 16 is released to return to the open position. The pin 38 moves along track portion D that curves toward portion E and into track portion E. The pin pushes the gate open (laterally or into the page as viewing the drawing). The pin 38 moves out of track portion E back into track portion A. The pin is trapped from further moving by the end of track portion A. The pin and lever are in the open unlocked position once again. Embodiments of the invention may have one or more tracks and more than one track may be used to increase the torque capacity if the mechanism.

Turning now to FIGS. 15-20, an alternative embodiment of a chuck for inflating a tire is shown that shares the advantages and some of the structures as described above. While the chuck is particularly well suited for use with a Presta valve, it can be adapted for use with other valves in applications where uniform, radial or lateral closure is desired.

Figure 15:
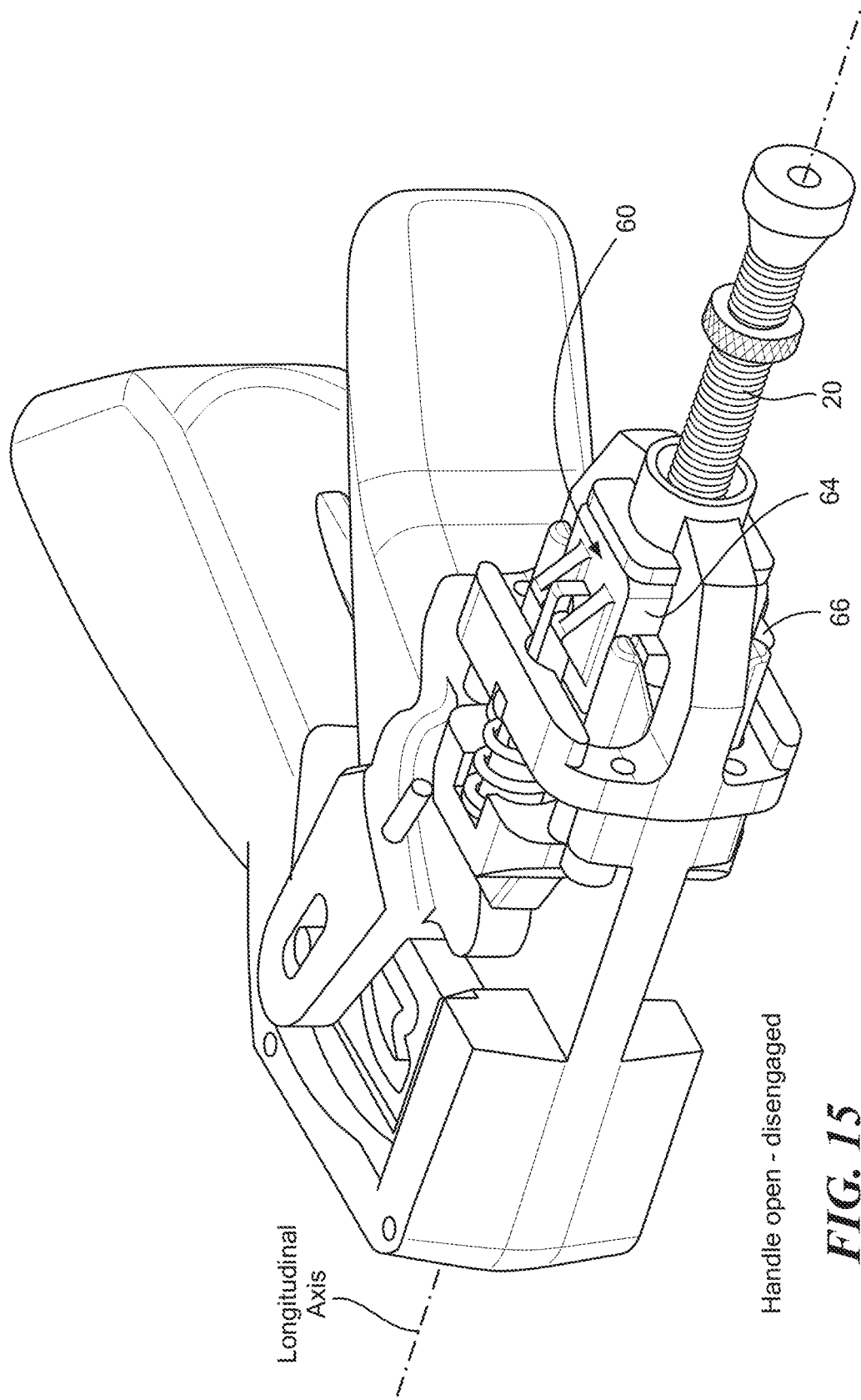
FIG. 15 illustrates an alternate embodiment of the pump chuck.

As shown in FIG. 15, a valve engagement device 60 has a longitudinal axis with a first portion 64 and a second portion 66 disposed about the longitudinal axis. The first portion 64 and the second portion 66 are movable laterally with respect to the longitudinal axis and in parallel with each other to define a chamber for receiving the valve stem, like that described above to include a sealing element 26.

Figure 16:
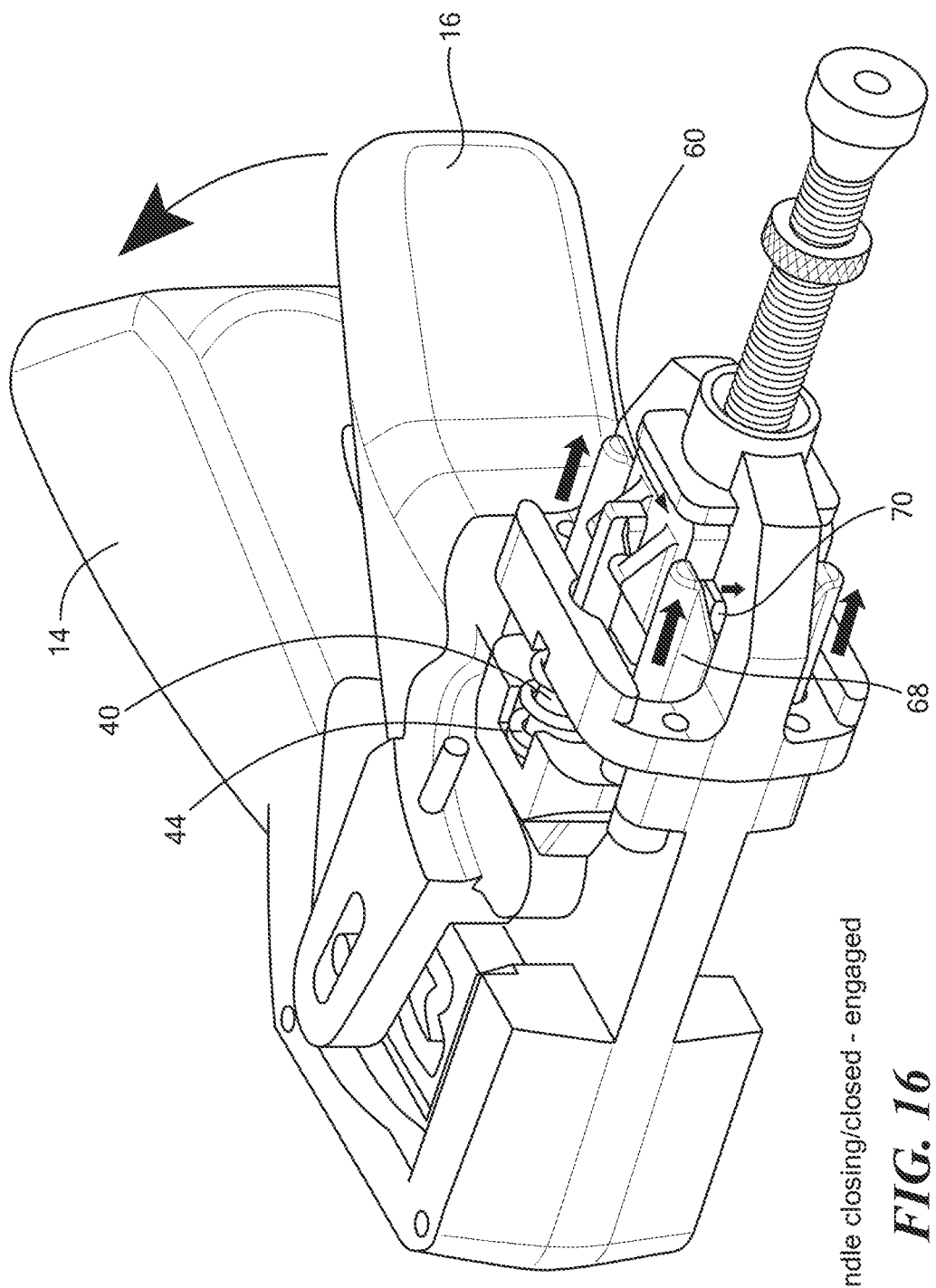
FIG. 16 shows the pump chuck of FIG. 15 with movement of an actuator and valve engagement portions.

As shown in FIG. 16, when the handle 16 is pulled toward the grip 14, a rod 40 rod pushes on an actuator 68 to move it longitudinally with respect to the valve engagement device 60 to cause the first portion 64 and the second portion 66 to move laterally and in parallel. A biasing element 44 urges the rod 40 in the opposite direction. The first portion and the second portion of the valve engagement device include protrusions 70 (each portion is a mirror image of the other and the opposing sides are mirrored so that it includes a protrusion that is identical to the one visible in the figures).

Figure 17:
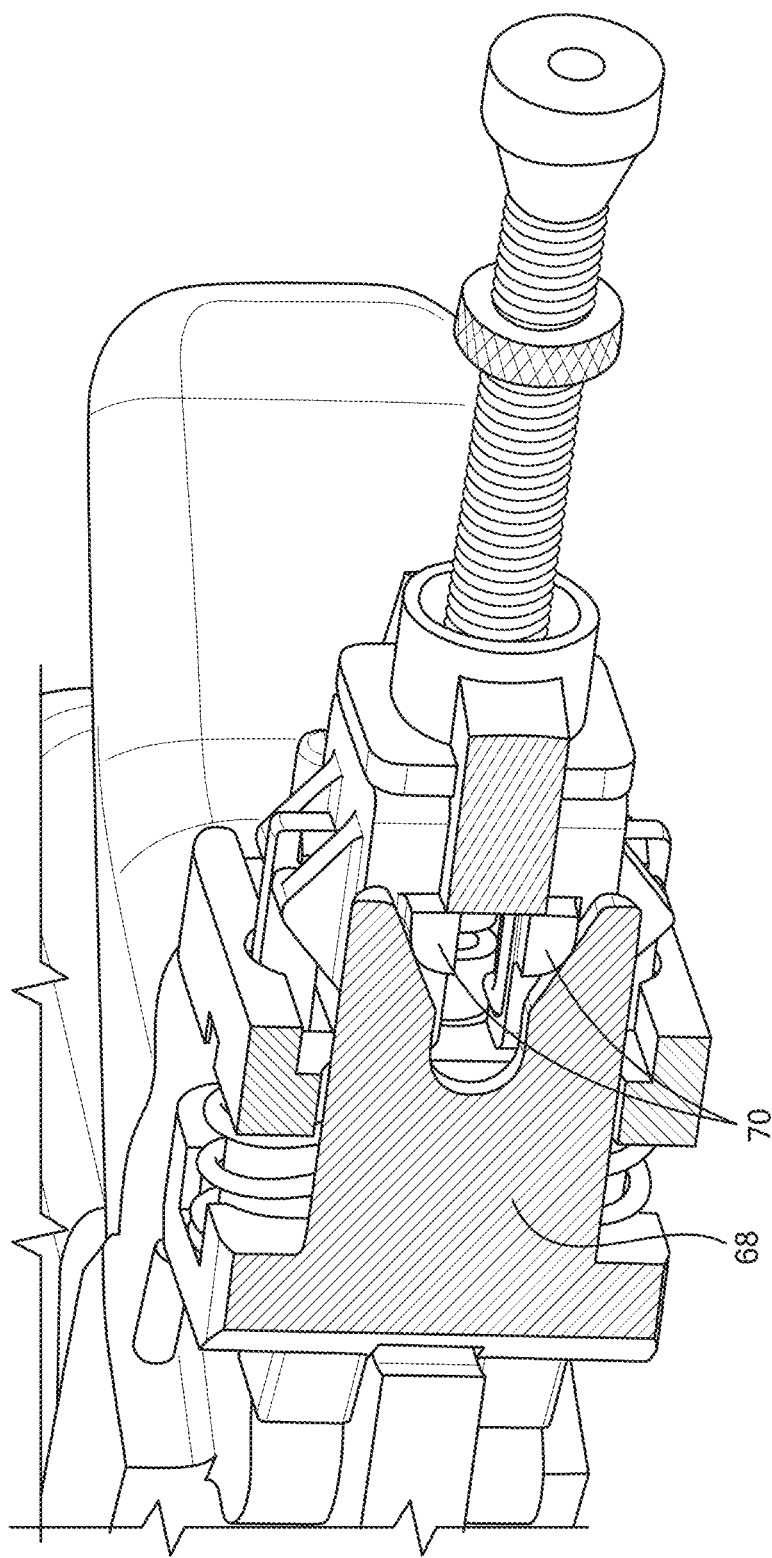
FIG. 17 is a detailed view of the actuator and valve engagement portions of FIG. 16.
Figure 18:
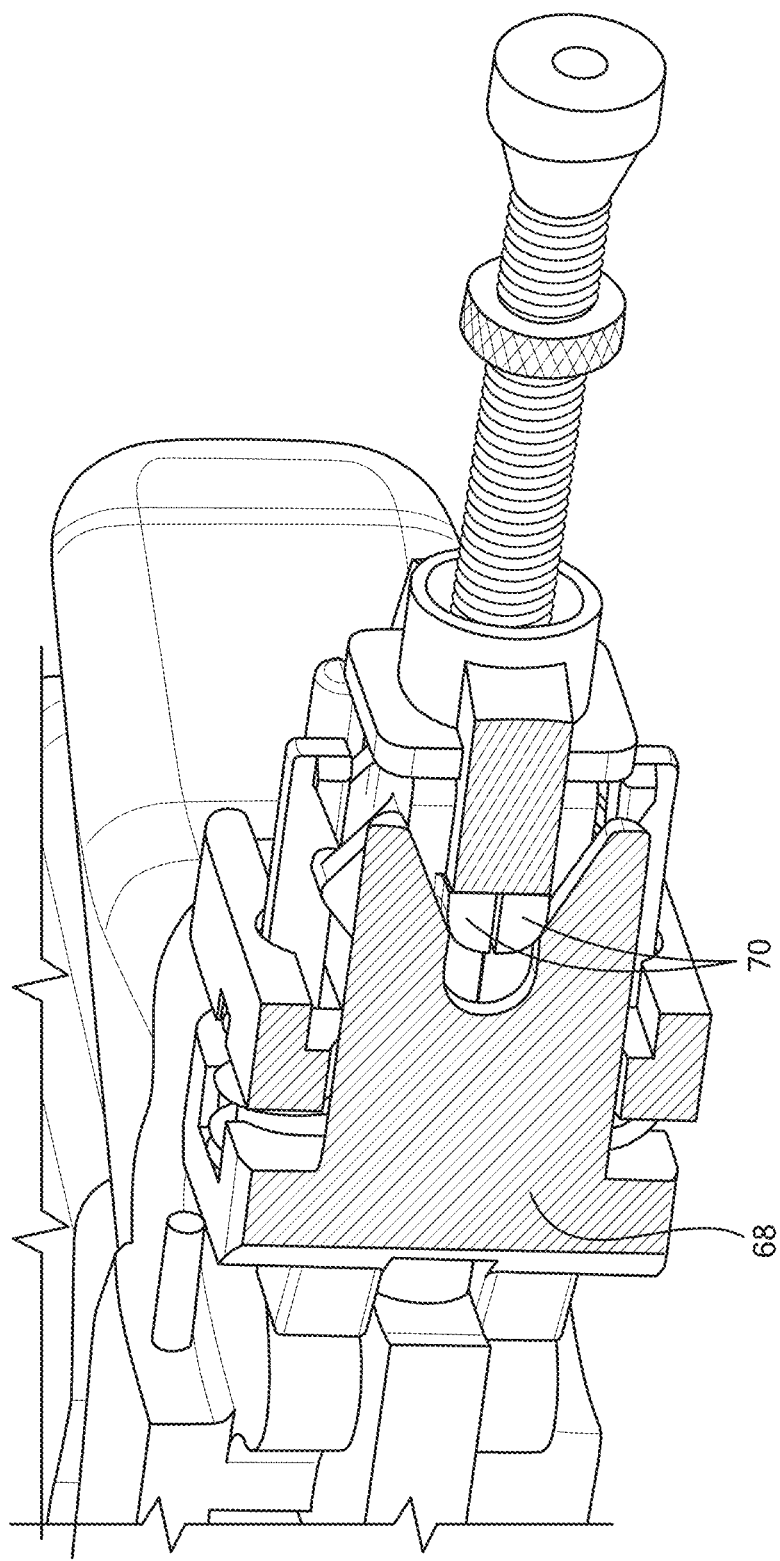
FIG. 18 shows the actuator and valve engagement portions in transition from an open to a closed position

Referring to FIG. 17, the actuator 68 contacts the protrusions 70 as the actuator is moved longitudinally and applies force to the protrusions to causes them to move or be held in a specific location. The protrusions 70 are shown with curved or ramped surfaces so that movement of the actuator 68 causes the first and second portions 64, 66 to move toward each other as shown in FIG. 18.

FIG. 19 is a perspective view of the actuator 68 and FIG. 20 is a perspective view of the first portion 64 of the valve engagement device 60, the second portion 66 being a mirror image thereof. The actuator 68 defines slots 72 for receiving the protrusions 70 as the actuator 68 moves longitudinally toward the valve engagement device 60. The slots 72 are open at a first end and closed at a second end and the open first end is wider than the closed second end. In an exemplary embodiment, the open first end is "V" shaped so that a distance between the protrusions 70 on the first portion 64 and the protrusions on the second portion 66 define a first protrusion diameter and the open first end defines an opening having a diameter that is larger than the first protrusion diameter and able to receive the protrusions when the first and second portions are at a maximum lateral separation. Lateral movement of the first portion 64 toward the second portion 66 creates a second protrusion diameter that is smaller than the first protrusion diameter. When the first and second portions are pressed together, the protrusions can be received within the closed second end to provide a zero-travel section 76. Thus, axial, longitudinal movement of the actuator to position the protrusions of the first and second portion at the closed second end of the slot inhibits lateral movement of the first portion and the second portion, thereby locking a valve stem within the valve engagement device in a closed, sealed position. Longitudinal movement of the actuator away from the valve engagement devices positions the protrusions of the first portion and second portion at the open first end of the slot allowing lateral movement of the first portion and the second portion thereby opening or unsealing the valve engagement device for easy removal of a valve stem.

Continuing to refer to FIGS. 19 and 20, another feature of the invention provides supplemental opening and closing features. Specifically, a lift device 78 extends longitudinally from a portion of the actuator 68 above and between the first and second actuator portions and it moves longitudinally with respect to the valve engagement device 60 to cause the first portion 64 and the second portion 66 to move laterally and in parallel away from each other by engaging a cam follower 80 on each portion. As illustrated, the lift device 78 is an elongated element with a cam surface 82 at a free distal end, wherein the valve engagement device includes the cam follower 80. Longitudinal movement of the lift device 78 causes the first portion and the second portion of the valve engagement device to move laterally away from the other as the protrusions 70 move beyond the zero-travel section 76 of the actuator 68.

A cam follower 80 is disposed on an outward face of at least one of the first portion and the second portion of the valve engagement device that is opposite the internal chamber. The cam follower 80 can include first and second cam elements 84 disposed side by side in a spaced apart relationship and wherein lift device 78 moves laterally and longitudinally between the first and second cam elements. A second cam follower can be disposed on the other of the first portion and the second portion of the valve engagement device. As shown, the cam surface 82 is inclined to allow the first and second portions to move toward each other as the lift device moves longitudinally past the cam elements and down the incline. When the lift device moves longitudinally away from the first portion 64, the cam elements 84 slide up the inclines to pull the first portion away from the second portion as the protrusions leave the zero-travel section 76 allowing the valve engagement device to open.

It will be appreciated by people skilled in the art that the present invention is not limited to what has been particularly shown and described herein above. In addition, unless mention was made above to the contrary, it should be noted that all the accompanying drawings are not to scale. A variety of modifications and variations are possible considering the above teachings without departing from the scope and spirit of the invention, which is limited only by the following claims.

What is claimed is:

1. A chuck for inflating a tire with a valve stem, comprising:
    a valve engagement device having a longitudinal axis, a first portion and a second portion that move laterally with respect to the longitudinal axis and in parallel with each other to define a chamber for receiving the valve stem; and
    an actuator that moves longitudinally with respect to the valve engagement device to cause the first portion and the second portion to move laterally and in parallel.

2. The chuck for inflating a tire with a valve stem of claim 1, wherein the first portion and the second portion of the valve engagement device include protrusions, and wherein the actuator contacts the protrusions as the actuator is moved longitudinally.

3. The chuck for inflating a tire with a valve stem of claim 2, wherein the actuator defines slots for receiving the protrusions as a cam mechanism moves longitudinally.

4. The chuck for inflating a tire with a valve stem of claim 3, wherein the slots are open at a first end and closed at a second end.

5. The chuck for inflating a tire with a valve stem of claim 4, wherein the open first end is wider than the closed second end.

6. The chuck for inflating a tire with a valve stem of claim 5, wherein the open first end is "V" shaped.

7. The chuck for inflating a tire with a valve stem of claim 5, wherein a distance between the protrusions on the first portion and the protrusions on the second portion define a first protrusion diameter and the open first end defines an opening having a diameter that is larger than the first protrusion diameter and able to receive the protrusions when the first and second portions are at a maximum lateral separation.

8. The chuck for inflating a tire with a valve stem of claim 7, wherein lateral movement of the first portion toward the second portion creates a second protrusion diameter that is smaller than the first protrusion diameter.

9. The chuck for inflating a tire with a valve stem of claim 8, wherein longitudinal movement of the actuator to position the protrusions of the first and second portion at the closed second end of the slot inhibits lateral movement of the first portion and the second portion.

10. The chuck for inflating a tire with a valve stem of claim 7, wherein longitudinal movement of the actuator to position the protrusions of the first portion and second portion at the open first end of the slot allows lateral movement of the first portion and the second portion.

11. The chuck for inflating a tire with a valve stem of claim 1, further comprising a lift device that moves longitudinally with respect to the valve engagement device to cause the first portion and the second portion to move laterally and in parallel away from each other.

12. The chuck for inflating a tire with a valve stem of claim 11, wherein the lift device is integral with the actuator and moves longitudinally with the actuator.

13. The chuck for inflating a tire with a valve stem of claim 12, wherein the lift device is an elongate element with a cam surface at a free distal end, wherein the valve engagement device further includes a cam follower, and wherein longitudinal movement of the lift device causes at least one of the first portion and the second portion of the valve engagement device to move laterally away from the other.

14. The chuck for inflating a tire with a valve stem of claim 13, wherein the cam follower is disposed on an outward face of at least one of the first portion and the second portion of the valve engagement device that is opposite the chamber.

15. The chuck for inflating a tire with a valve stem of claim 14, wherein the actuator includes a first and second actuator element disposed side by side in a spaced apart relationship and wherein the valve engagement device moves laterally and longitudinally between the first and second actuator element.

16. The chuck for inflating a tire with a valve stem of claim 15, wherein the lift device includes a first and second lift element disposed between the first and second actuator element in a spaced apart relationship and wherein the valve engagement device moves laterally and longitudinally between the first and second actuator element.

17. The chuck for inflating a tire with a valve stem of claim 16, further comprising a second cam follower disposed on the other of the first portion and the second portion of the valve engagement device.

18. The chuck for inflating a tire with a valve stem of claim 17, wherein longitudinal movement of the actuator element toward the valve engagement device causes the valve engagement device to close and longitudinal movement of the actuator element away from the valve engagement device causes the valve engagement device to open.

19. A chuck for inflating a tire with a valve stem, comprising:
 a valve engagement device having a longitudinal axis, a first portion and a second portion that move laterally with respect to the longitudinal axis and in parallel with each other to define a chamber for receiving the valve stem;
 an actuator that moves longitudinally with respect to the valve engagement device to cause the first portion and the second portion to move laterally and in parallel; and
 a lift device that moves longitudinally with respect to the valve engagement device to cause the first portion and the second portion to move laterally and in parallel away from each other.

20. The chuck for inflating a tire with a valve stem of claim 19, wherein longitudinal movement of the actuator element toward the valve engagement device causes the valve engagement device to close and longitudinal movement of the actuator element away from the valve engagement device causes the valve engagement device to open.

\* \* \* \* \*